(12) United States Patent
Akaishi

(10) Patent No.: US 9,183,475 B2
(45) Date of Patent: Nov. 10, 2015

(54) IMAGE PROCESSING METHOD AND APPARATUS CONFIGURED FOR PRINTING A PLURALITY OF MONOCHROME IMAGES HAVING DIFFERENT PARAMETERS

(71) Applicant: CANON KABUSHIKI KAISHA, Tokyo (JP)

(72) Inventor: Takahisa Akaishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/963,929

(22) Filed: Aug. 9, 2013

(65) Prior Publication Data

US 2014/0055818 A1 Feb. 27, 2014

(30) Foreign Application Priority Data

Aug. 21, 2012 (JP) .................................. 2012-182639

(51) Int. Cl.
| | |
|---|---|
| H04N 1/60 | (2006.01) |
| G06K 15/02 | (2006.01) |
| H04N 1/407 | (2006.01) |
| H04N 1/46 | (2006.01) |

(52) U.S. Cl.
CPC .......... *G06K 15/1878* (2013.01); *H04N 1/4078* (2013.01); *H04N 1/465* (2013.01)

(58) Field of Classification Search
None
See application file for complete search history.

(56) References Cited

U.S. PATENT DOCUMENTS

| | | | | |
|---|---|---|---|---|
| 5,297,058 | A   * | 3/1994  | Samworth ....................... | 382/167 |
| 6,172,681 | B1 * | 1/2001  | Ueda .............................. | 345/589 |
| 6,340,975 | B2   | 1/2002  | Marsden et al. | |
| 6,459,501 | B1   | 10/2002 | Holmes | |
| 6,701,011 | B1 * | 3/2004  | Nakajima ....................... | 382/167 |
| 7,397,572 | B1 * | 7/2008  | Horii ............................. | 358/1.13 |
| 7,447,350 | B2   | 11/2008 | Akaishi | |
| 7,599,096 | B2   | 10/2009 | Yoshida | |
| 7,636,178 | B2 * | 12/2009 | Nakatani et al. ............... | 358/1.9 |
| 7,729,019 | B2   | 6/2010  | Yamada et al. | |
| 7,869,092 | B2 * | 1/2011  | Nakatani et al. ............... | 358/1.9 |
| 8,310,723 | B2 * | 11/2012 | Nakatani et al. ............... | 358/1.9 |
| 8,390,889 | B2 * | 3/2013  | Iguchi .......................... | 358/3.01 |
| 2004/0227977 | A1 * | 11/2004 | Yoshida ....................... | 358/3.01 |
| 2006/0012809 | A1 * | 1/2006  | Shimada ....................... | 358/1.9 |
| 2007/0236758 | A1 * | 10/2007 | Ariga ........................... | 358/518 |
| 2008/0055679 | A1 * | 3/2008  | Yoshida ........................ | 358/518 |
| 2008/0123948 | A1   | 5/2008  | De Baer | |
| 2010/0157336 | A1 * | 6/2010  | Nakatani ....................... | 358/1.9 |
| 2011/0116137 | A1   | 5/2011  | Uratani et al. | |
| 2011/0170142 | A1 * | 7/2011  | Ito et al. ....................... | 358/3.24 |
| 2012/0050766 | A1 * | 3/2012  | Saiki ............................. | 358/1.9 |
| 2014/0055797 | A1 * | 2/2014  | Obayashi ....................... | 358/1.9 |

FOREIGN PATENT DOCUMENTS

JP 2004-142423 A 5/2004

OTHER PUBLICATIONS

U.S. Appl. No. 13/963,939, filed Aug. 9, 2013, by Masaaki Obayashi.

* cited by examiner

*Primary Examiner* — Dung Tran
(74) *Attorney, Agent, or Firm* — Fitzpatrick, Cella, Harper & Scinto

(57) ABSTRACT

An image processing apparatus acquires monochrome image data and, for a pattern of each parameter, converts the acquired monochrome image data into intermediate image data. The intermediate image data is expressed in a set of signal values of a plurality of color elements.

46 Claims, 13 Drawing Sheets

IMAGE PROCESSING METHOD AND APPARATUS CONFIGURED FOR PRINTING A PLURALITY OF MONOCHROME IMAGES HAVING DIFFERENT PARAMETERS

BACKGROUND OF THE INVENTION

1. Field of the Invention

The present invention relates to an image processing apparatus and an image processing method for performing pattern printing, and a storage medium storing a program.

2. Description of the Related Art

In order for a user to output a desired color, color printers have color tone adjustment functions (color balance, brightness, contrast, color tone, etc.). However, there are cases where it is difficult even for an experienced person to determine what parameters to adjust and how much to adjust them. For this reason, a pattern printing function is an example of a function for a user to determine this by looking at colors output by actually printing on a printing medium. "Pattern printing" is a function for changing the color tone of a color image multiple ways, compositing them into one color image, and printing it when a determination is to be made regarding the coloration of the color image. In the flow of image data in pattern printing, image data pieces are generated by performing predetermined color adjustment on an RGB signal for input image data, and a pattern image is generated by editing the layout of those into one piece of image data. Subsequently, the image data is printed on a printing medium after undergoing color material color development processing, halftoning processing, and printer control processing.

On the other hand, a monochrome image requires pattern printing in which different color tones such as a pure black tone, a warm black tone, and a cool black tone are reproduced. However, in the case of a monochrome image, a more refined tonal expression compared to that of a color image has been requested by users, and thus a greater degree of tonal reproduction control than in the case of color images is needed. Therefore, if color image pattern printing is used as-is in a processing flow for a monochrome image, the tonality will be insufficient. Accordingly, if color processing and monochrome processing are both used, particularly in color processing using a 3DLUT, more processing control points (number of grid points in the 3DLUT) than are used in color processing are needed to satisfy requirements for a monochrome image. Also, there is another method in which color processing and monochrome processing are separated and performed in separate processing flows. Japanese Patent Laid-Open No. 2004-142423 discloses that color processing and monochrome processing are performed separately, a pattern printing image is composited based on image data that has undergone color material color development in monochrome processing, and pattern printing of a monochrome image is performed.

However, in Japanese Patent Laid-Open No. 2004-142423, color processing and monochrome processing are performed separately and a pattern printing function is added to the monochrome processing, and therefore if configured by hardware, the image processing circuit size increases, which influences the product cost. Also, since compositing of a pattern printing image is performed after color material color development, the number of image data pieces (channels) handled in compositing processing is larger in a printing apparatus using color materials such as light cyan, light magenta, and light gray in addition to CMYK. This causes an increase in the amount of memory used for compositing processing, an increase in product cost, a decrease in printing processing speed, and the like. For example, if the compositing of a pattern printing image that has undergone color material color development is performed by software, the amount of image data after color material color development rises in proportion to the number of color materials in the printing apparatus, thereby causing a decrease in printing speed.

SUMMARY OF THE INVENTION

An aspect of the present invention is to eliminate the above-mentioned problems with the conventional technology. The present invention in its first aspect provides an image processing apparatus and an image processing method for improving the efficiency of pattern printing processing, and a storage medium for storing a program.

The present invention in its first aspect provides an image processing apparatus for processing monochrome image data so as to print a pattern of a plurality of monochrome images having different parameters, the image processing apparatus comprising: an acquisition unit configured to acquire the monochrome image data indicating a gradation of monochrome image in a predetermined number of gradations; a first conversion unit configured to, for a pattern of each of the parameters, convert the monochrome image data acquired by the acquisition unit into intermediate image data expressed in a set of signal values of a plurality of color elements; and a transfer unit configured to transfer to a determination unit configured to determine a color material amount to be used when printing the pattern of each parameter, based on image data which is converted by the first conversion unit.

According to the present invention, the efficiency of pattern printing processing can be improved.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be denoted by the same reference signs, and redundant descriptions thereof will be omitted.

Embodiment 1

Configuration of Image Processing System

An image processing system in the present embodiment performs pattern printing in which multiple images obtained by performing multiple types of color adjustment (color tone, brightness, contrast, etc.) with respect to one monochrome image are printed in one group. In the image processing system, a user can select an image of a desired color tone from the printed material obtained by pattern printing, and can again output the monochrome image using the selected color tone setting.

Figure 1:
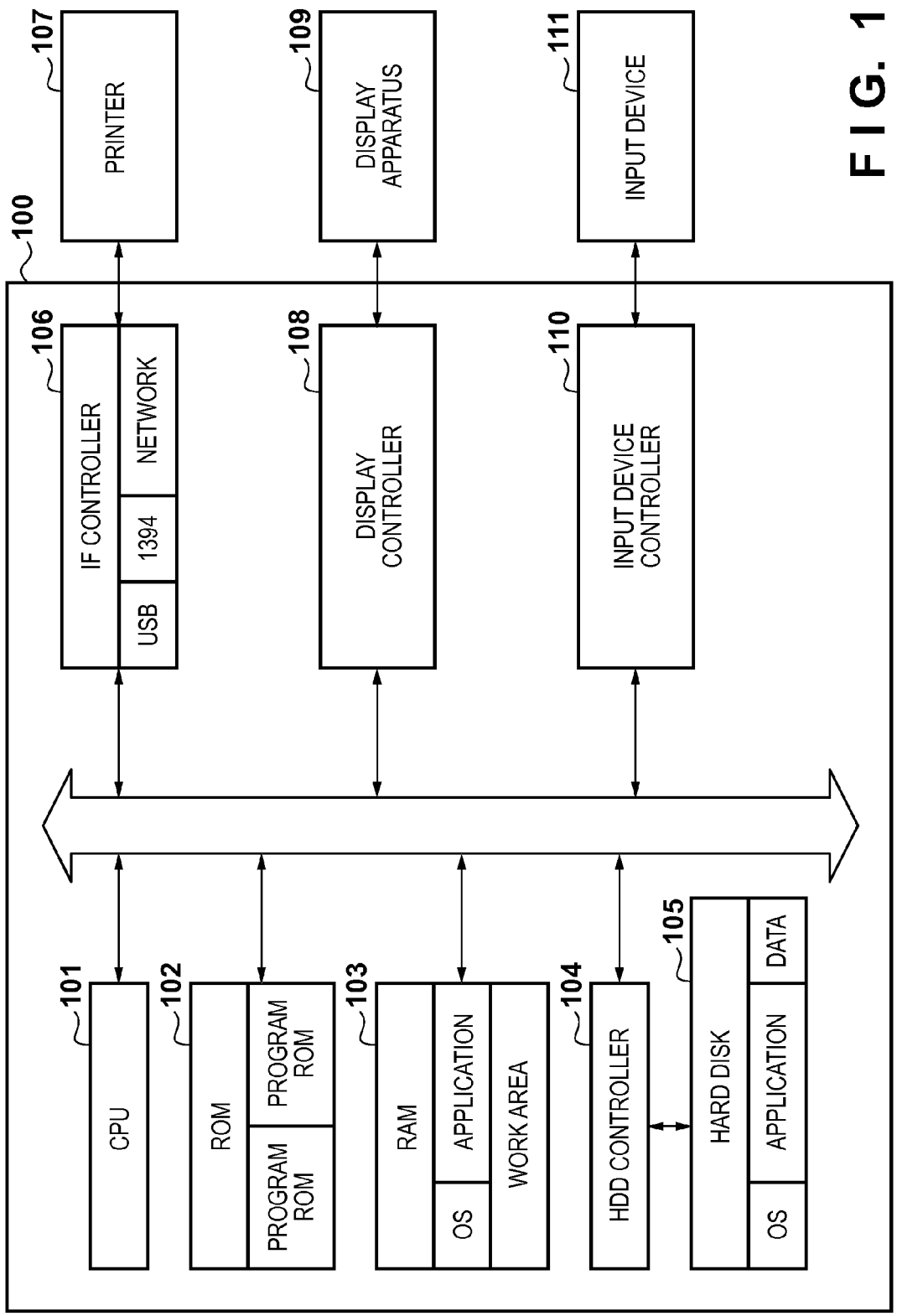
FIG. 1 is a diagram showing a configuration of an image processing system.

FIG. 1 is a diagram showing a configuration of an image processing system for executing pattern printing for a monochrome image according to embodiments of the present invention. A CPU 101 performs overall control of a host computer 100. A ROM 102 stores programs for controlling controllers of the host computer 100, and also stores data used by those programs. An HDD controller 104 performs data control such as data writing/readout with respect to a hard disk 105. The hard disk 105 stores an OS and an application that run on the host computer 100, as well as data used by that application. A RAM 103 stores the OS and the application loaded from the hard disk 105 via the HDD controller 104. The OS and the application loaded to the RAM 103 are executed by the CPU 101. Also, the RAM 103 is used as a work area as well when applications are running.

A printer 107 is a color printer that uses light cyan (Lc), light magenta (Lm), dark gray (Gy), and light gray (Lg) as color materials in addition to CMYK (cyan, magenta, yellow, black). An ink jet type of ink jet printing apparatus for example may be used as the color printer. An interface controller 106 performs reception and transmission of data between the printer 107 and the host computer 100. When a user executes a print command in an application, print data is generated using a printer driver stored in the hard disk 105, and the print data is transmitted to the printer 107 via the interface controller 106. The print data is RGB data or color material color data for example. A display controller 108 controls a display apparatus 109. Under control of the CPU 101, an input device controller 110 accepts input of an instruction from the user of the host computer 100 given using an input device 111. The input device 111 is a keyboard or a pointing device for example. The user of the host computer 100 can perform interactive operations in the application running on the host computer 100 by using the display apparatus 109 and the input device 111.

Pattern Printing Flow

Figure 2:
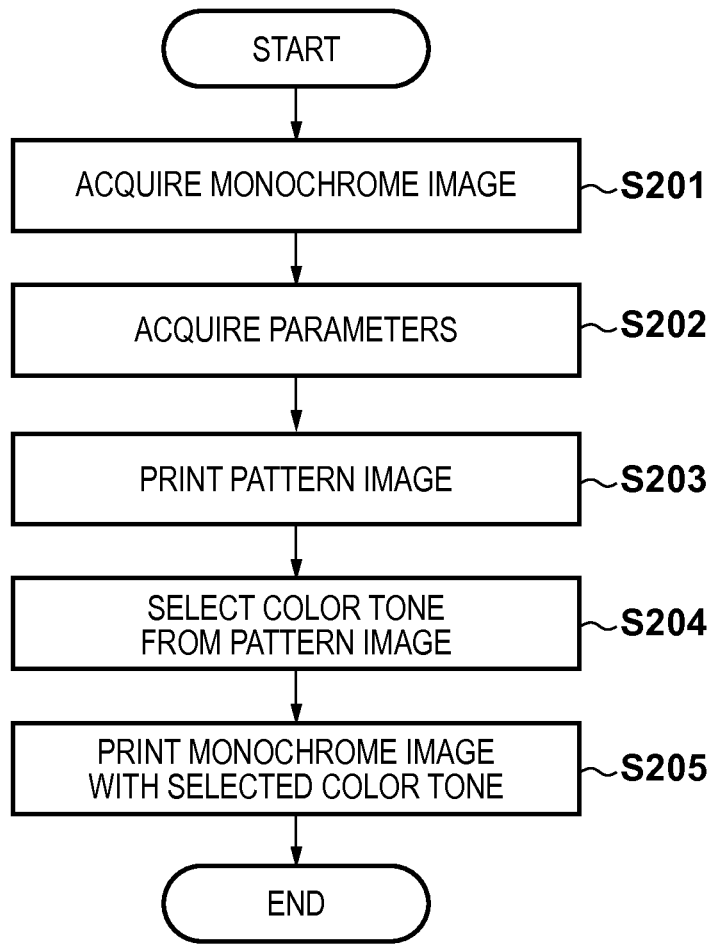
FIG. 2 is a diagram showing a procedure of processing for the case where color tone adjustment is performed in pattern printing.

FIG. 2 is a flowchart showing a procedure of processing in the case where color adjustment is performed in pattern printing in the present embodiment. The processing shown in FIG. 2 is executed by the CPU 101 controlling the units in FIG. 1 for example. The user starts an application for performing pattern printing, using the display apparatus 109 and the input device 111. The application is stored in the hard disk 105 for example.

In step S201, the CPU 101 acquires monochrome image data, which is to be the pattern printing target. The CPU 101 may acquire the monochrome image data directly from an external device, or it may acquire the monochrome image data by receiving input of RGB image data and converting that image data to grayscale using a predetermined RGB ratio. In step S202, the CPU 101 acquires parameters set for pattern printing images in pattern printing.

Figure 3:
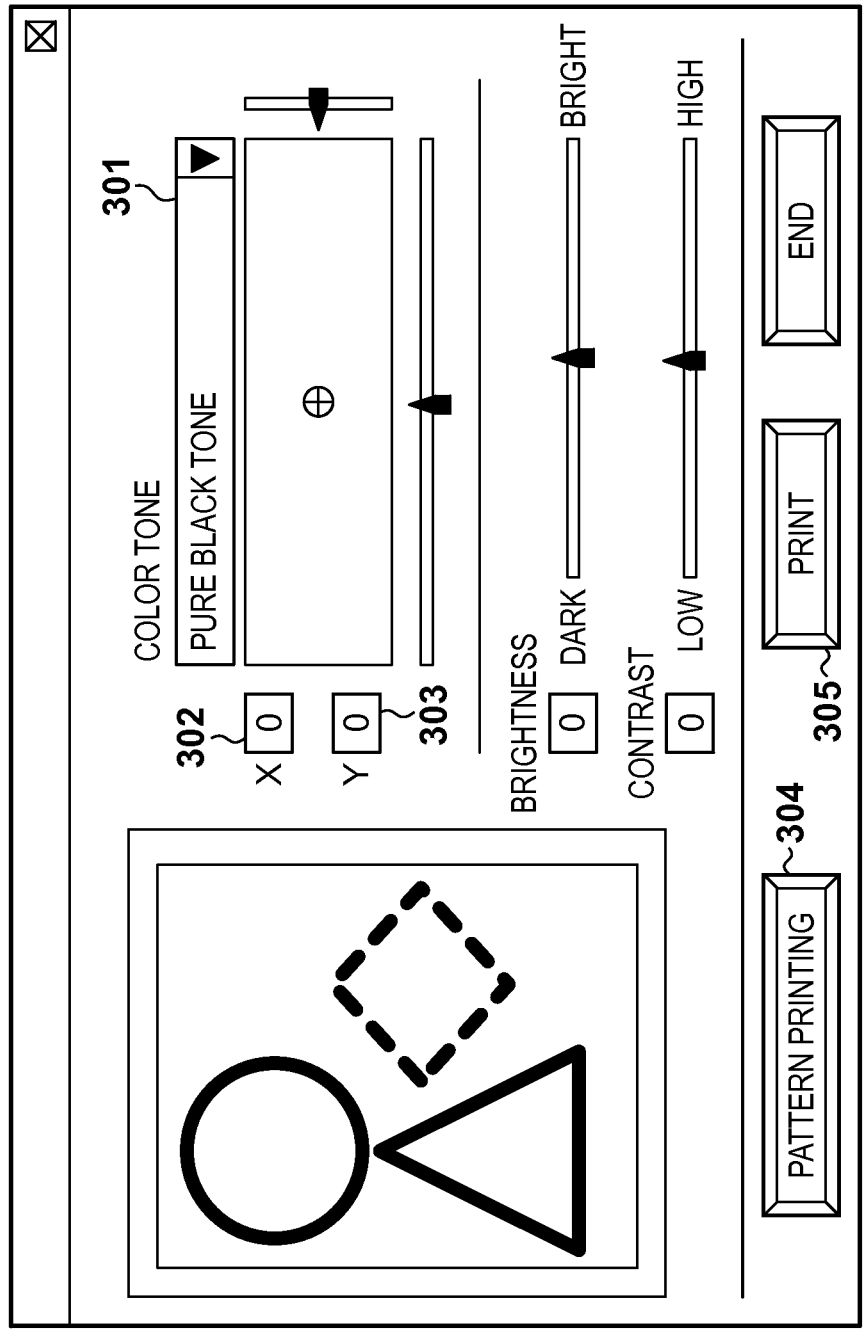
FIG. 3 is a diagram showing an example of a GUI in pattern printing.
Figure 4:
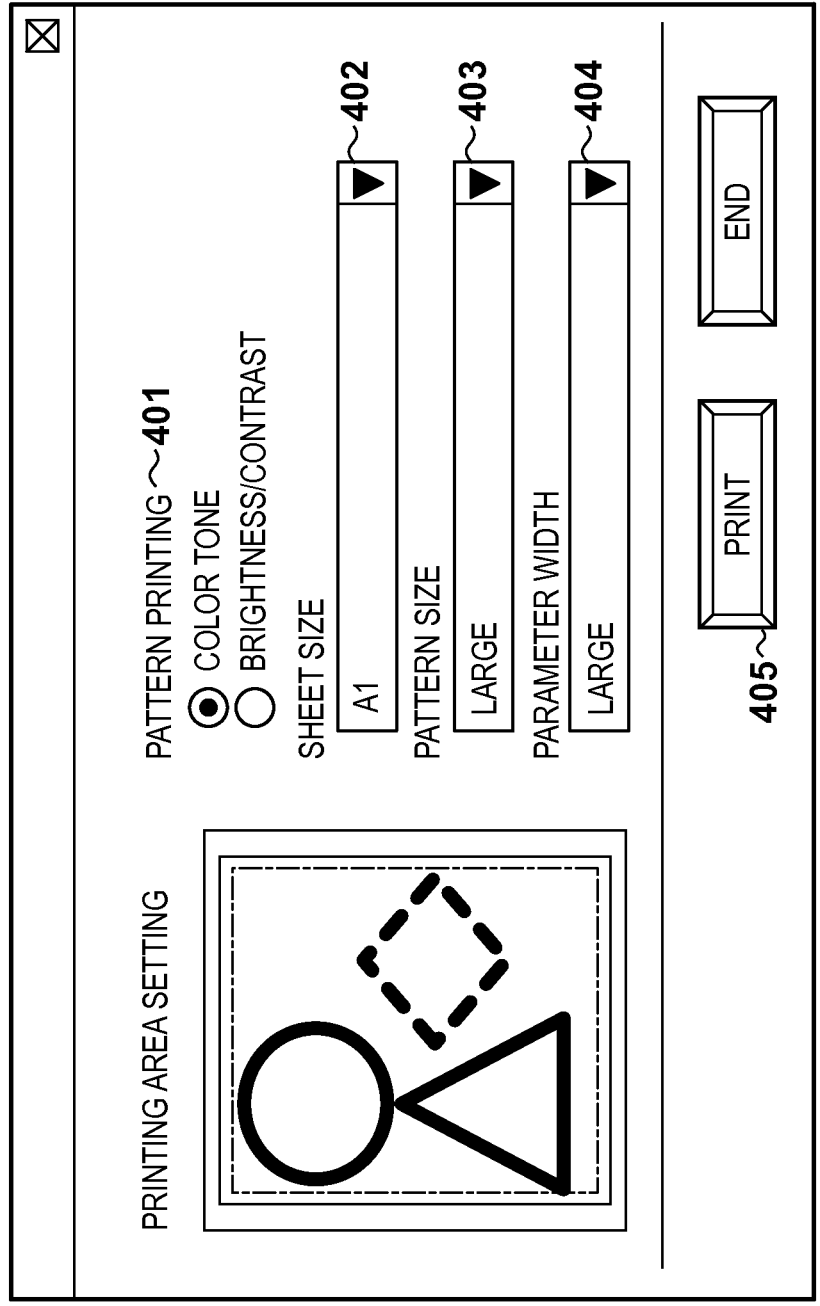
FIG. 4 is a diagram showing another example of a GUI in pattern printing.

FIGS. 3 and 4 are diagrams showing examples of GUIs displayed by an application for performing pattern printing. With the setting screen in FIG. 3, the user can set central parameters for color tone, brightness, contrast, and the like for when changing multiple parameter values in pattern printing. A list box 301 is used when the user selects a color tone preset. Presets such as "pure black tone", "warm black tone", and "cool black tone" are displayed in a user-selectable manner in the list box 301. Furthermore, to allow the user to perform color tone adjustment, the setting screen displays a parameter X 302 for adjusting the color tone in a yellow-blue direction, and a parameter Y 303 for adjusting the color tone in a cyan-red direction. The color tone parameter X 302 and the color tone parameter Y 303 are coordinated with the color tone presets in the list box 301, and when the user changes the color tone preset, the values of the color tone parameter X 302 and the color tone parameter Y 303 also change in coordination.

When the user presses a pattern printing button 304, a pattern printing setting screen in FIG. 4 opens. A radio button 401 displays the types of parameters to be changed in pattern printing in a user-selectable manner. In the case in FIG. 4, the user can select either "color tone" or "brightness/contrast" using the radio button 401. If the user selects "color tone", pattern printing images that have undergone changes in color tone will be generated. Also, if the user selects "brightness/contrast", pattern printing images that have undergone changes in brightness and contrast will be generated. The pattern printing setting screen in FIG. 4 displays sheet size 402, pattern size 403, and parameter range 404 as list boxes. The user can select various types of sheet sizes using the sheet size 402. Also, the user can select large, medium, or small using the pattern size 403. Also, using the parameter range 404, the user can select large, medium, or small as the degree of change when changing "color tone" or "brightness/contrast". In FIG. 4, the sheet size 402 is configured such that large, medium, or small is selected, but it may be configured such that the user can directly input a sheet size. Also, the parameter range 404 is also configured such that large, medium, or small is selected, but it may be configured such that the user can directly input number values corresponding to the parameter X 302 and the parameter Y 303 in FIG. 3. The user can set parameters needed in pattern printing using the setting screens in FIGS. 3 and 4. The parameters set in the setting screens in FIGS. 3 and 4 are stored in a data region in the hard disk 105.

In step S203, the CPU 101 generates a pattern printing image and performs printing processing. The processing in step S203 is started when an instruction is given due to the user pushing a printing button 405 in FIG. 4 using the input device 111. The CPU 101 reads out the parameters for pattern printing set in step S202 from the data region in the hard disk 105, and generates pattern printing image data and image processing parameters based on the parameter values. The generated pattern printing image data and image processing parameters are transmitted to the printer 107 via the I/F controller 106.

Figure 5:
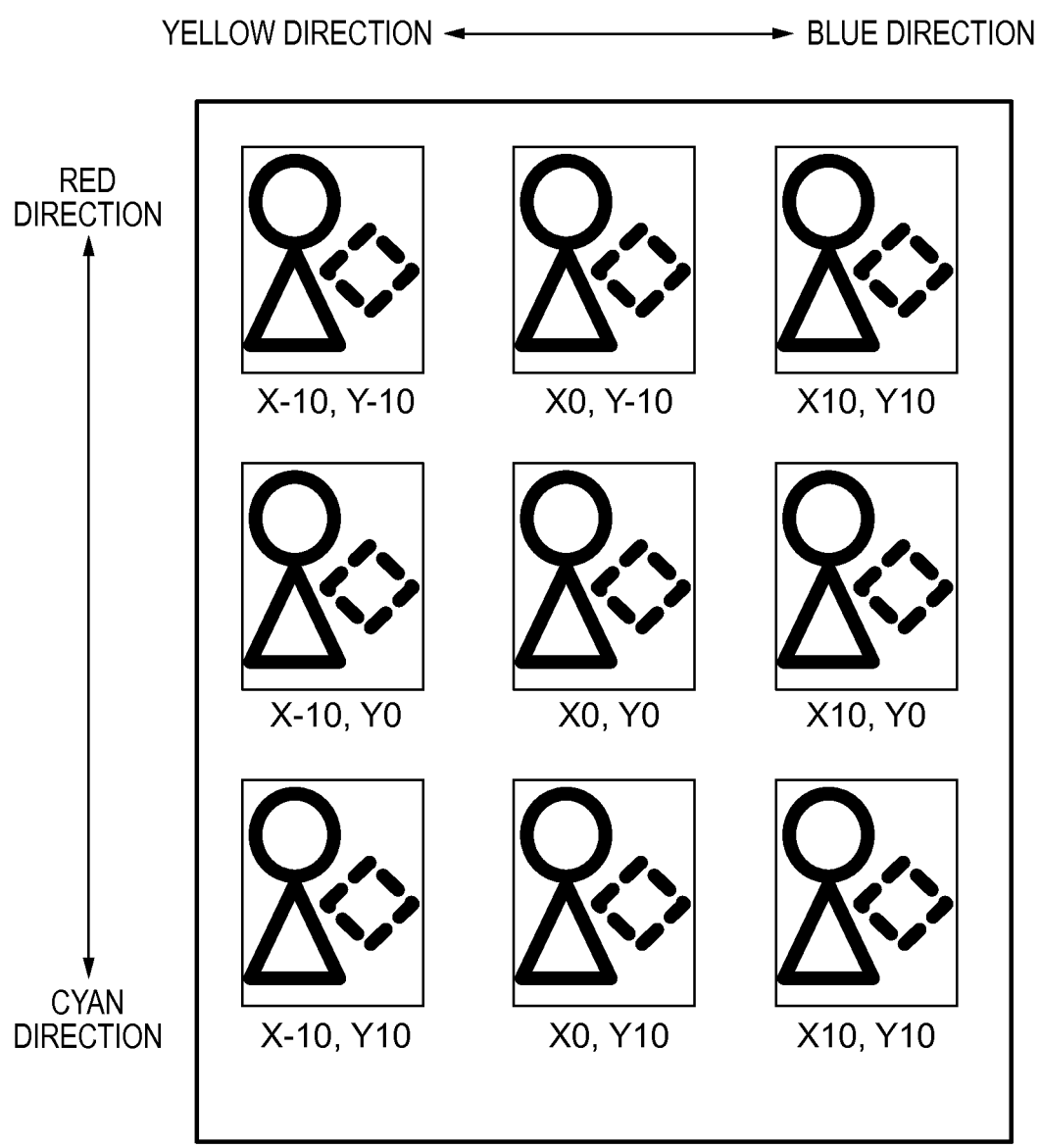
FIG. 5 is a diagram showing an example of a pattern printing image.

FIG. 5 is a diagram showing an example of a pattern printing image. Color adjustment parameters are printed below the patterns in the pattern printing image. The printed color adjustment parameters are the values of the parameter X 302 and the parameter Y 303 in FIG. 3. The user can easily find out the settings of each pattern in the pattern printing image using the printed color adjustment parameters. A procedure of image processing for generating a pattern printing image will be described later. In step S204, the CPU 101 receives a selection of color tones set in the pattern printing image from the user. In step S205, the CPU 101 once again sets the color adjustment parameters corresponding to the received color tones as parameters that can be set in the setting screen in FIG. 3. If the user pushes a printing button 305 to give an instruction using the input device 111, the CPU 101 starts printing processing using the color tones selected by the user with respect to the monochrome image data.

Processing in the Case of a Color Image

Figure 6:
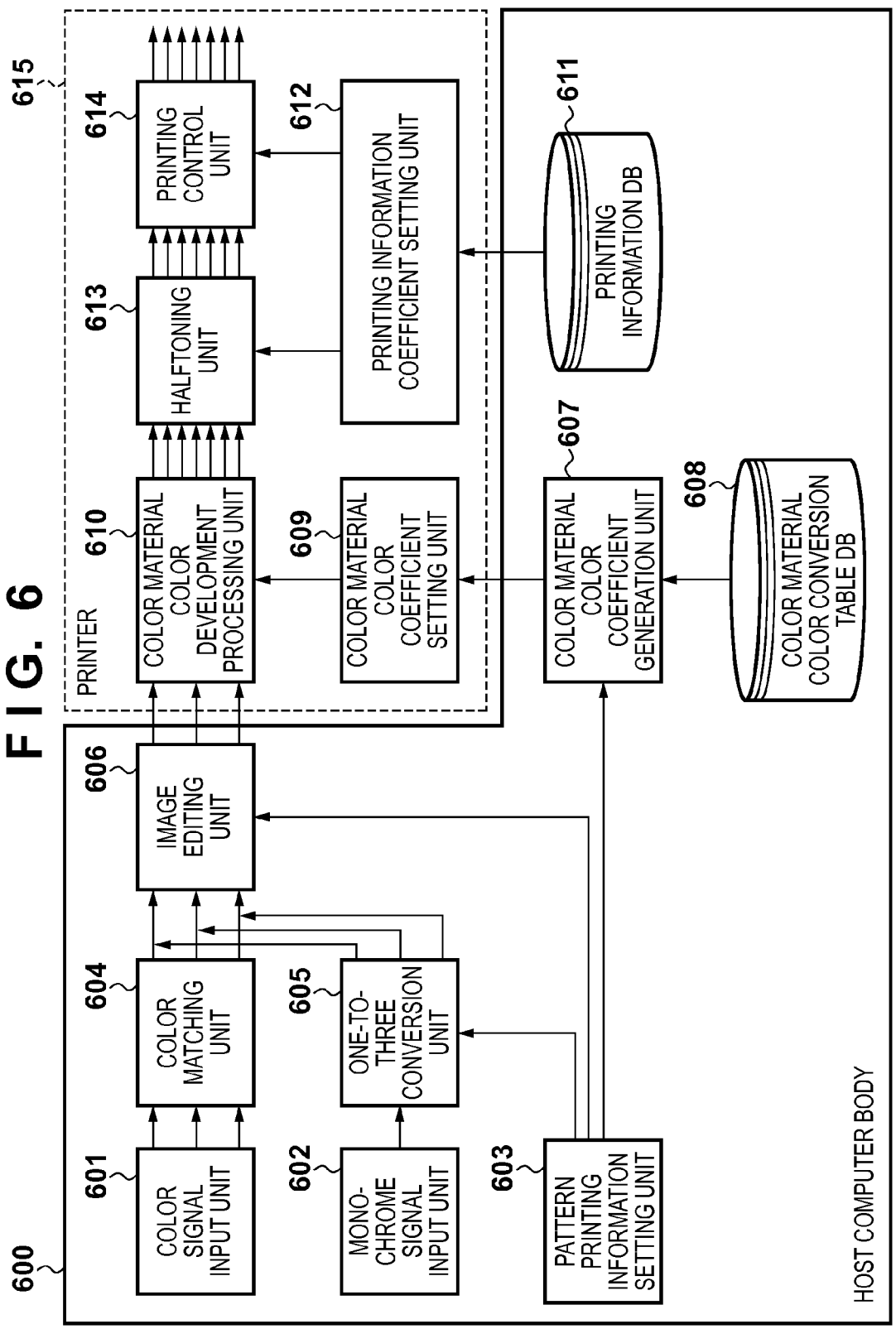
FIG. 6 is a diagram showing a configuration of an image processing unit in the image processing system.

Here, image processing for generating a pattern printing image in step S203 will be described. FIG. 6 is a diagram showing a configuration of an image processing unit for generating a pattern printing image in an image processing system. Below, in the case of a color image, image data is described as being 24-bit data, each color having 8 bits, and in the case of a monochrome image, image data is described as being 8-bit data. A host computer 600 has, among the constituent elements of an image processing unit, a color signal input unit 601, a monochrome signal input unit 602, a color matching unit 604, an image editing unit 606, a one-to-three conversion unit 605, a pattern printing information setting unit 603, and a color material color coefficient generation unit 607. The host computer 600 also has a color material color conversion table database (DB) 608 and a printing information DB 611. Also, a printer 615 has, among the constituent elements of an image processing unit, a color material color development processing unit 610, a color material color coefficient setting unit 609, a halftoning unit 613, a printing control unit 614, and a printing information coefficient setting unit 612. Although illustrated as described above in FIG. 6, the host computer 600 may further include the color material color development processing unit 610 and the color material coefficient setting unit 609.

First, a case of a color image will be described below. The color signal input unit 601 receives an input of RGB data for a color image (24-bit data, each color being 8 bits), and outputs it to the color matching unit 604. The color matching unit 604 performs color conversion from a standard sRGB space into a device RGB space, for example, by means of a three-dimensional lookup table (3DLUT). In a 3DLUT, color conversion parameters (RGB values) are set as output values on 16 grid points placed at intervals of 17 values for example (in other words, 16×16×16=4096 grid points), and RGB values between grid points are calculated using an interpolation calculation. Color conversion parameters in the 3DLUT change depending on the printing medium, such as a sheet, and the printing mode, and for example, they are created in advance, stored in the hard disk 105, read out according to need, and set on the grid points. If pattern printing is to be performed, the image editing unit 606 performs layout processing for one piece of image data using multiple pieces of pattern printing image data. If pattern printing is not to be performed, the image editing unit 606 executes enlargement/reduction processing to adjust the image to a desired size.

RGB data in the device RGB space processed by the image editing unit 606, image processing parameters for image processing to be performed by the printer 615, and printer control parameters are transmitted to the printer 615. The color material color development processing unit 610 performs, using the 3DLUT, color conversion of RGB data in the device RGB space into color material color data that corresponds to a color material color space. Here, "color material colors" are eight colors including Lc, Lm, Gy, and Lg, in addition to CMYK. In a 3DLUT in the color material color development processing unit 610, color conversion parameters are also set as output values on 16 grid points placed in intervals of 17 values (4096 grid points), and RGB data between grid points is calculated using an interpolation calculation. The color conversion parameters in the 3DLUT in the color material color development processing unit 610 change depending on the printing medium and printing mode. The color conversion parameters in the 3DLUT are created in advance, stored in the color material color conversion table DB 608 on the hard disk 105, read out by the color material color coefficient setting unit 609 according to need, and set on the grid points for example.

Using an ED method or the like, the halftoning unit 613 binarizes color material color data that has undergone color conversion by the color material color development processing unit 610. Then, the printing control unit 614 executes processing necessary for printing, such as print path resolution, and performs printing on a printing medium. Image processing parameters used by the halftoning unit 613 and the printing control unit 614 also change depending on the printing medium and printing mode used. For example, they are created in advance, stored in the printing information DB 611 on the hard disk 105, read out by the printing information coefficient setting unit 612 according to need, and set in the halftoning unit 613 and the printing control unit 614.

Image processing in the case of a color image was described above. It is also possible to perform image processing on monochrome image data as color image data where R=G=B. However, in general, compared with color images, tone expression is particularly important in monochrome images. Accordingly, if monochrome image data is converted into color image data and undergoes image processing according to the aforementioned configuration, it is necessary for the number of grid points in the 3DLUT to be increased from 16 to 32 or 64, and for fine control to be enabled for the tone characteristics in printing. However, as a result of this, the circuit size increases, causing an increase in product cost.

Processing in the Case of a Monochrome Image

In view of this, with regards to pattern printing of a monochrome image, image processing is performed as follows in the present embodiment. First, the monochrome signal input unit 602 receives an input of monochrome image data that is 8-bit data, and outputs it to the one-to-three conversion unit 605. Also, the pattern printing information setting unit 603 reads out parameters for pattern printing set in the setting screens in FIGS. 3 and 4 from the hard disk 105, and sets pattern printing information, which is information that is needed for pattern printing. Here, pattern printing information is number of pattern images, pattern image arrangement, pattern image size, color adjustment parameters regarding the pattern images, and information on the storage position of the color material color conversion table in the 3DLUT regarding the pattern images. The information on the storage position of the color material color conversion table in the 3DLUT regarding the pattern images will be described later. The pattern printing information setting unit 603 transmits pattern printing information to the one-to-three conversion unit 605, the image editing unit 606, and the color material color coefficient generation unit 607.

The one-to-three conversion unit 605 receives an input of monochrome image data and converts the gray tone values on the gray lines into RGB signal values in a color space with use of a one-to-three conversion table. The converted RGB signal values correspond to the RGB signal values of input values in the 3DLUT in the downstream color material color development processing unit 610. Also, the one-to-three conversion table will be described later. The conversion performed by the one-to-three conversion unit 605 is performed once for each pattern image. The image editing unit 606 receives an input of one piece of RGB data (intermediate image data) converted by the one-to-three conversion unit 605 for each pattern image and composites the pattern images into one piece of image data in accordance with the sizes of the pattern images and the arrangement of the pattern images, which were set by the pattern printing information setting unit 603.

Figure 7B:
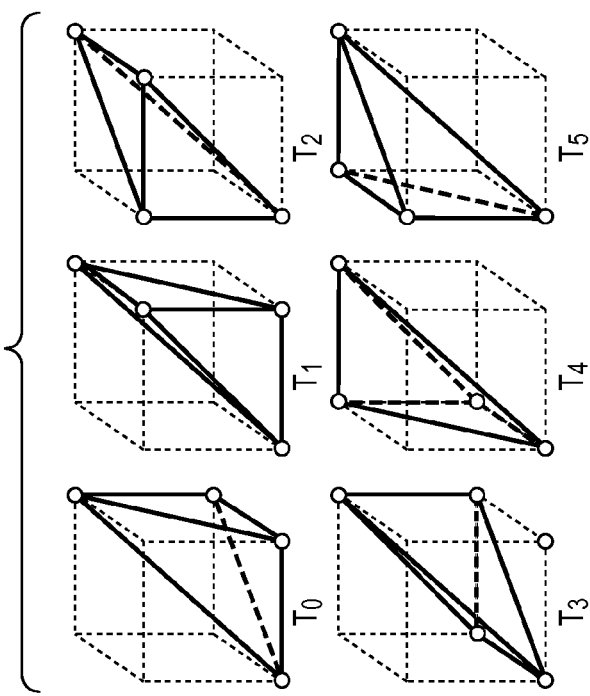
FIGS. 7A and 7B are diagrams for describing positions of input values.
Figure 7A:
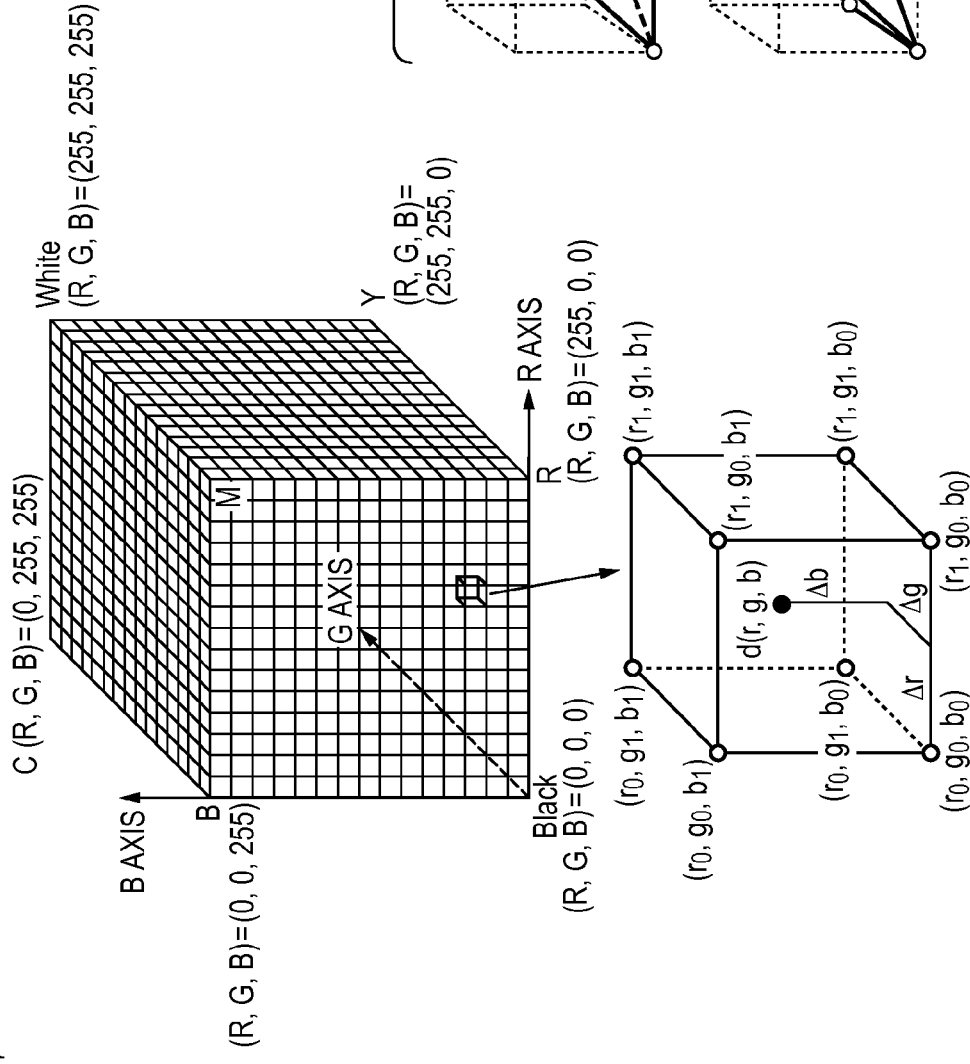
Figure 8:
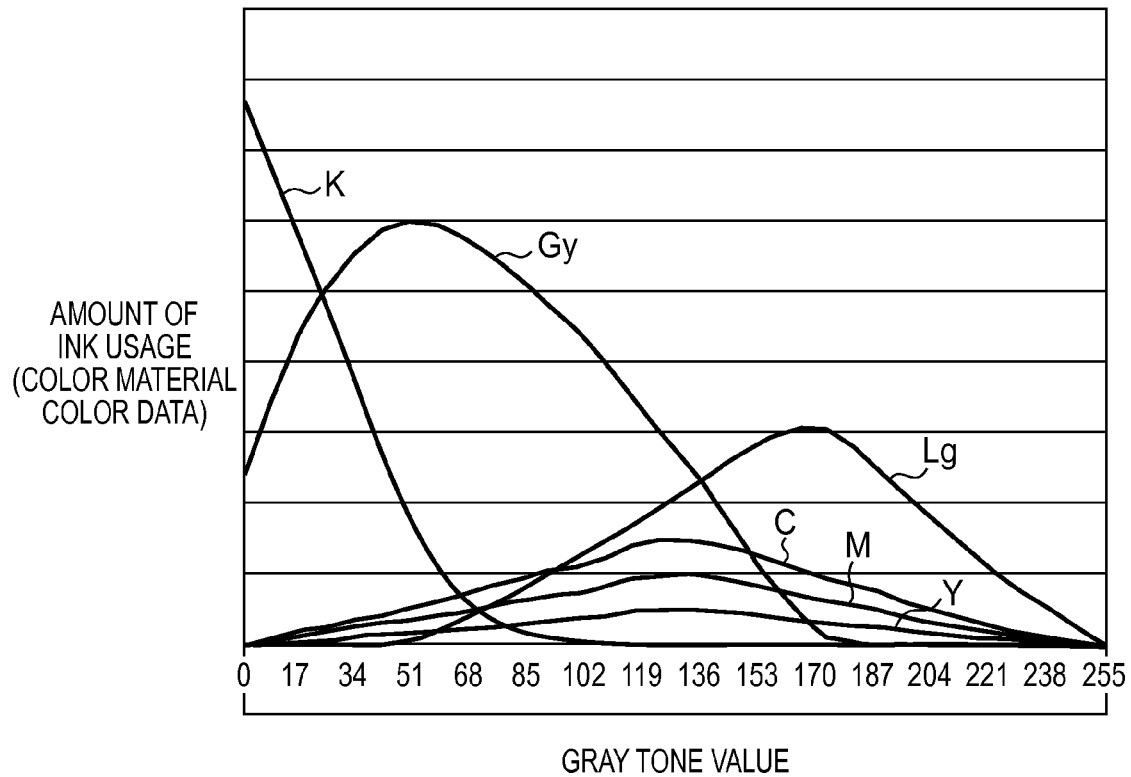
FIG. 8 is a diagram showing an example of a 1DLUT.
Figure 9:
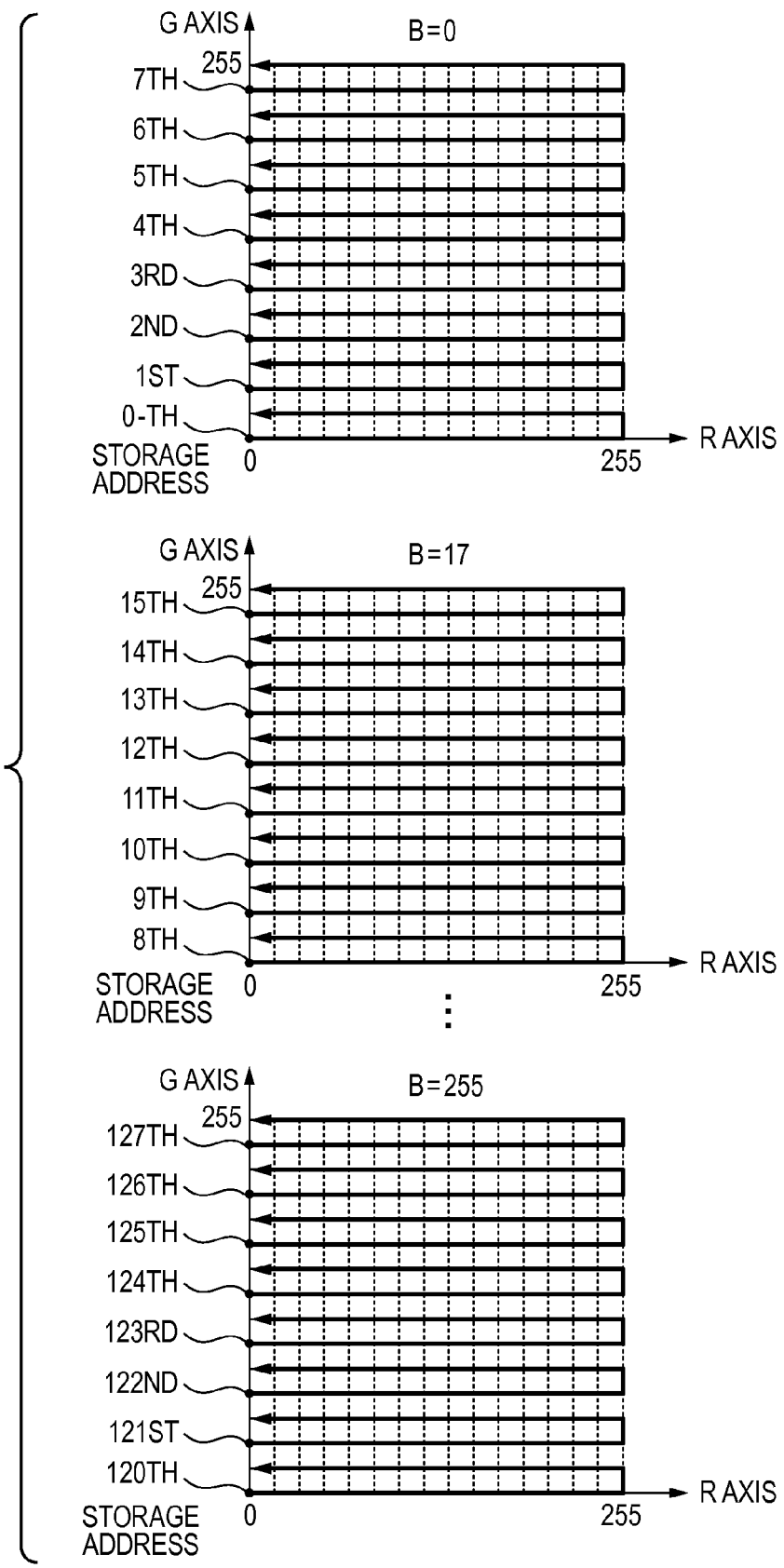
FIG. 9 is a diagram showing an example of the mapping of the 1DLUT to a 3DLUT.

The color material color development processing unit 610 converts the RGB data transmitted from the image editing unit 606 into color material color signals. The 3DLUT used at that time has 4096 grid points expressed as 16 grid points for each axis of RGB, as shown in FIG. 7A. The 3DLUT used in the color material color development processing unit 610 is the same as that in conventional technology in terms of the number of grid points. However, the color material color data values set by the color material color coefficient setting unit 609 are mapped (stored) as output values on the coordinate points of the RGB signal values transmitted from the image editing unit 606. The aforementioned "information on the storage position of the color material color conversion table in the 3DLUT" refers to the mapping in the 3DLUT of color material color data to coordinate points expressed by RGB signal values transmitted from the image editing unit 606. In the present embodiment, RGB signal values transmitted from the image editing unit 606 are values following the direction of the arrow shown in the 0-th line in FIG. 9. FIG. 9 shows an example of a lookup table in the present embodiment. In other words, it means that the gray tone value is converted by the one-to-three conversion unit 605 so as to be such an RGB signal value. Also, color material color data values are mapped to the coordinate points in the direction of the arrow shown in the 0-th line in FIG. 9. In other words, whereas gray tone values and color material data are mapped to each other in a 1DLUT as shown in FIG. 8, a gray tone value is first converted into RGB data with the one-to-three conversion table. Then, furthermore, it is converted into color material color data corresponding to RGB signal values using the 3DLUT. According to this configuration, in the present embodiment, the configuration of color material color conversion processing can be the same for a monochrome image and a color image. Then, when pattern images are composited into one piece of data, RGB data is handled rather than color material color data, and therefore the amount of data can also be reduced. Also, although described later, if interpolation processing in a normal 3DLUT is performed during color material color development processing by the color material color development processing unit 610, it is possible to obtain results that are the same as with interpolation processing in a conventional 1DLUT. Accordingly, tone control similar to that in conventional technology can be performed for a monochrome image. Color material color data resulting from color conversion by the color material color development processing unit 610 undergoes printing processing via the halftoning unit 613 and the printing control unit 614, similarly to the case of the color image.

The color material color coefficient generation unit 607 generates a 3DLUT to be used by the color material color development processing unit 610 in accordance with color adjustment parameters for pattern images set by the pattern printing information setting unit 603, and in accordance with the information on the storage position of the color material color conversion table in the 3DLUT. The color material color coefficient generation unit 607 acquires, from the color material color conversion table DB 608, the color material color conversion table for monochrome images that corresponds to the color tone (X, Y) designated on the setting screens in FIGS. 3 and 4. The color material color conversion table DB 608 is a color material color conversion table (1DLUT) that corresponds to FIG. 8 for example, and it stores all color tones that can be designated on the setting screens in FIGS. 3 and 4 for each printing medium. The color material color coefficient generation unit 607 maps output values (color material color signal values) corresponding to gray tone values in the color material color conversion table acquired from the color material color conversion table DB 608, in an RGB space according to the storage position information set by the pattern printing information setting unit 603. It was described that the color material color conversion table 608 stores all color tones that can be designated on the setting screens in FIGS. 3 and 4. However, a color material color conversion table that corresponds to color tones designated on the setting screens in FIGS. 3 and 4 may be obtained by performing an interpolation calculation based on color material color conversion tables stored in advance in the color material color conversion table DB 608. The 3DLUT generated by the color material color coefficient generation unit 607 in the host computer 600 is transmitted to the color material color coefficient setting unit 609 in the printer 615. Then, the color material color coefficient setting unit 609 sets the transmitted 3DLUT in the color material color development processing unit 610.

Operation by the Color Material Color Coefficient Generation Unit

Conventionally, in the case where color material color development processing is performed with respect to monochrome image data in which the input values are gray tone values (gradation values) (i.e., the input value is 1-channel), color material color development processing is performed using a 1DLUT for conversion into color material color data, and subsequently, halftone processing is performed. Thus, the configuration was separate from that of color material color development processing performed by a 3DLUT with respect to color image data, and therefore the circuit size was bigger, which influenced product cost.

In the present embodiment, the one-to-three conversion unit 605, the color material color coefficient generation unit 607, and the color material color development processing unit 610, which is used for color image data, are combined, and color material color development processing is performed for monochrome image data. In other words, in the present embodiment, color material color development processing for monochrome data (8 bits, 256 gradations) is not performed using a 1DLUT, and is instead performed using the color material color conversion table (a 3DLUT) in the color material color development processing unit 610. As a result, it is an aim of the present invention to prevent an increase in circuit size caused by having a separate configuration for monochrome image data as in conventional technology. In the present embodiment, the term "channel" refers to an image data signal, "one channel" meaning a monochrome image signal, "3 channels" meaning an RGB signal, and "4 channels" meaning a CMYK signal for example. Besides RGB and CMYK, it is possible to use YCbCr, Lab, XYZ, or the like to express other image data signals.

Effects of the Present Embodiment

Figure 12:
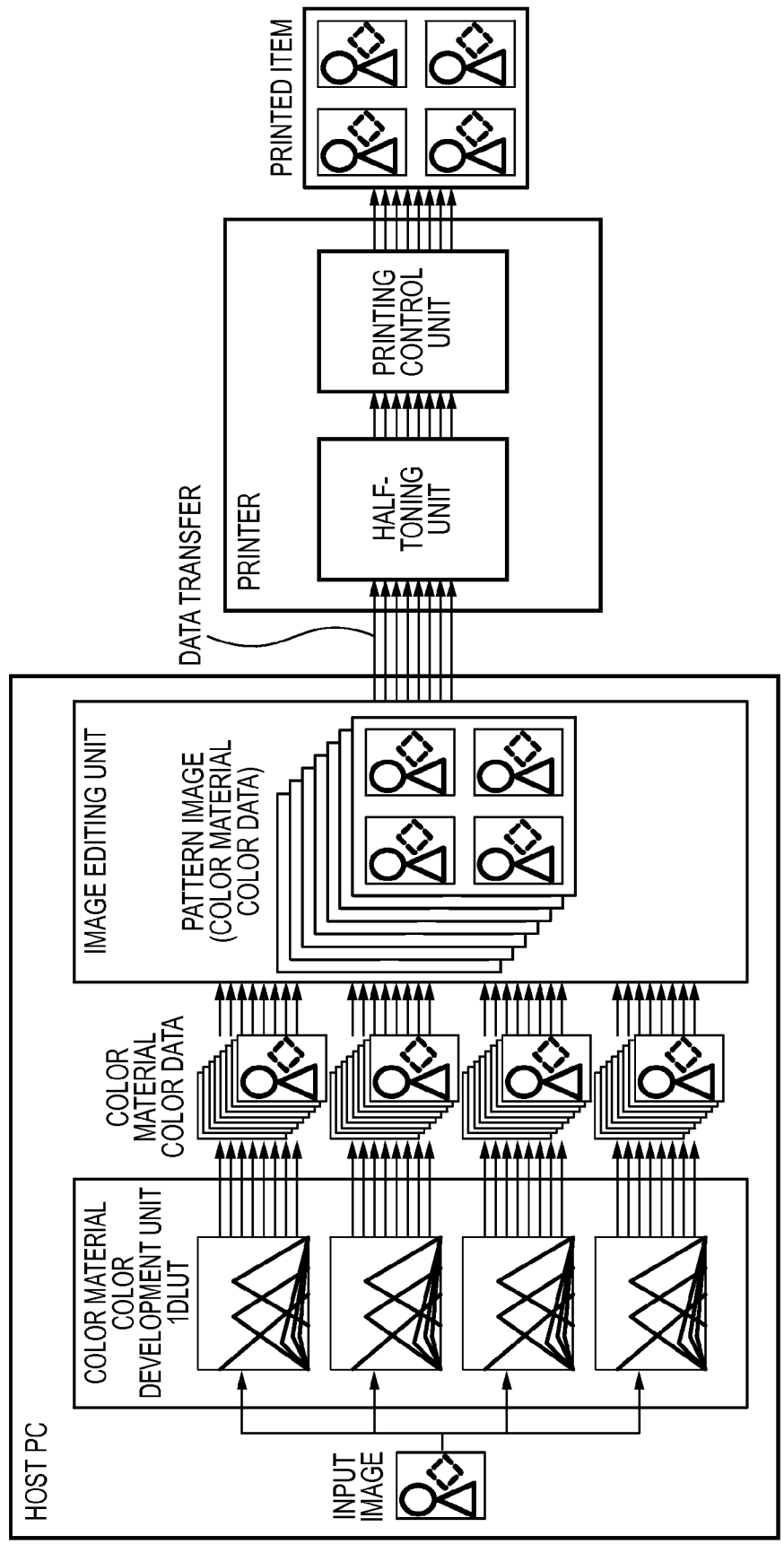
FIG. 12 is a diagram showing conventional pattern printing processing.

Here, effects of the present embodiment in comparison to conventional technology will be described. FIG. 12 is a diagram for describing a flow of color material color development processing for monochrome image data in conventional technology. First, input monochrome image data is developed into color material color data using a 1DLUT for printing monochrome images corresponding to color tones, the developed color material color data for color tones is composited by an image editing unit, and a pattern printing image is generated on one printing medium. In the configuration in FIG. 12, the amount of data used (number of channels) in compositing increases as the number of color material colors in the printing apparatus increases, and therefore compositing processing is time-consuming, thus slowing down the printing speed. Also, since the amount of memory used for compositing processing increases as well, product cost is affected. Generally, compositing processing is performed by software on a host computer in order to prevent the increase in circuit scale that occurs in the case where compositing processing is implemented by hardware. However, since a pattern printing image after undergoing compositing processing is color material color data, it has a data amount of eight channels. Accordingly, a longer time is required for transfer when transferring data to the printer, which invites a decrease in printing speed.

Figure 13:
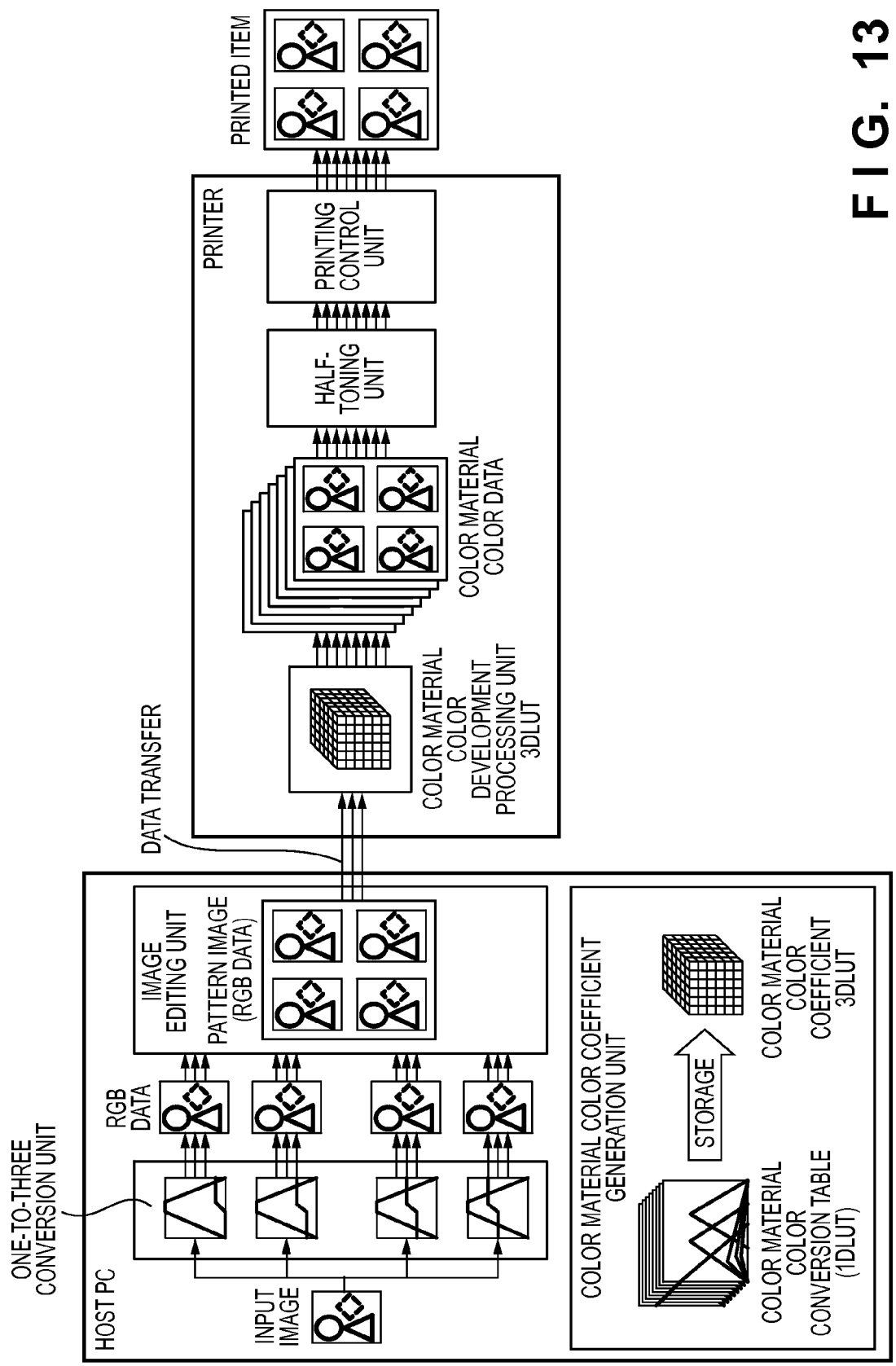
FIG. 13 is a diagram showing pattern printing processing.

FIG. 13 is a diagram for describing a flow of color material color development processing for monochrome image data in the present embodiment. First, with respect to input monochrome image data, the monochrome image data is subjected to one-to-three conversion using a one-to-three conversion table that corresponds to color tones. Here, "one-to-three conversion" refers to outputting an RGB signal value for each gray tone value (gradation value). In other words, RGB data is generated with respect to the input monochrome image data, using one-to-three conversion. Then, RGB data corresponding to the color tones is composited by the image editing unit, and one piece of pattern image data is generated. In the present embodiment, pattern image data is generated as RGB data, unlike in FIG. 12. Accordingly, the amount of data to be transferred to the printer can be suppressed to three channels-worth of data, and thus it is possible to prevent a decrease in printing speed. Color material color data corresponding to RGB signal values is output by the printer using the 3DLUT of the present embodiment.

Generation of 3DLUT in the Color Material Color Development Processing Unit 610

Next, the generation of a 3DLUT used by the color material color development processing unit 610 will be described. A 1DLUT conventionally used for monochrome image data, such as that shown in FIG. 8, maps color material color data to gray tone values. In the present embodiment, the color material color coefficient generation unit 607 maps gray tone values to an RGB space. At that time, the color material color coefficient generation unit 607 maps the gray tone values in FIG. 8 to consecutive adjacent grid points in the RGB space in order. Here, "consecutive adjacent grid points" means grid points that are in a positional relationship such that, in the case of calculating an output value corresponding to an input value that is on a line segment that connects two adjacent grid points in the RGB space, interpolation calculation is performed based on only those two grid points.

For example, in this description, interpolation calculation for a 3DLUT is performed using tetrahedral interpolation. With tetrahedral interpolation, first, it is specified which cube an input value d (r, g, b) will be included in by performing a comparison with the grid points in the 3DLUT. FIG. 7A shows a positional relationship between the grid points of the specified cube and the input value d. An output value (r', g', b') of the input value d is calculated using Equation 1.

$$(r',g',b')=(r0',g0',b0')+c1 \times \Delta r/(r1-r0)+c2 \times \Delta g/(g1-g0)+c3 \times \Delta b/(b1-b0) \quad (1)$$

Here, (r0', b0', b0') is the output value of the grid point (r0, g0, b0). Also, coefficients c1 to c3 are calculated as described below, depending on which of the six tetrahedrons (T0 to T5) shown in FIG. 7B the output value d is included in. Here, (R', G', B') rxbxgx expresses an output value on the grid point (rx, gx, bx).

If input value d is included in tetrahedron T0, i.e., if $\Delta r/(r1-r0) \geq \Delta g/(g1-g0) \geq \Delta b/(b1-b0)$:
  c1=(R', G', B') r1g0b0—(R', G', B') r0g0b0
  c2=(R', G', B') r1g1b0—(R', G', B') r1g0b0
  c3=(R', G', B') r1g1b1—(R', G', B') r1g1b0

If input value d is included in tetrahedron T1, i.e., if $\Delta r/(r1-r0) \geq \Delta b/(b1-b0) \geq \Delta g/(g1-g0)$:
  c1=(R', G', B') r1g0b0—(R', G', B') r0g0b0
  c2=(R', G', B') r1g1b1—(R', G', B') r1g0b1
  c3=(R', G', B') r1g0b1—(R', G', B') r1g0b0

If input value d is included in tetrahedron T2, i.e., if $\Delta g/(g1-g0) \geq \Delta r/(r1-r0) \geq \Delta b/(b1-bg0)$:
  c1=(R', G', B') r1g1b0—(R', G', B') r0g1b0
  c2=(R', G', B') r0g1b0—(R', G', B') r0g0b0
  c3=(R', G', B') r1g1b1—(R', G', B') r1g1b0

If input value d is included in tetrahedron T3, i.e., if $\Delta g/(g1-g0) \geq \Delta b/(b1-b0) \geq \Delta r/(r1-r0)$:
  c1=(R', G', B') r1g1b0—(R', G', B') r0g1b1
  c2=(R', G', B') r0g1b0—(R', G', B') r0g0b0
  c3=(R', G', B') r0g1b1—(R', G', B') r0g1b0

If input value d is included in tetrahedron T4, i.e., if $\Delta b/(b1-b0) \geq \Delta r/(r1-r0) \geq \Delta g/(g1-g0)$:
  c1=(R', G', B') r1g0b1—(R', G', B') r0g0b1
  c2=(R', G', B') r1g1b1—(R', G', B') r1g0b1
  c3=(R', G', B') r0g0b1—(R', G', B') r0g0b0

If input value d is included in tetrahedron T5, i.e., if $\Delta b/(b1-b0) \geq \Delta g/(g1-g0) \geq \Delta r/(r1-r0)$:
  c1=(R', G', B') r1g1b1—(R', G', B') r0g1b1
  c2=(R', G', B') r0g1b1—(R', G', B') r0g0b1
  c3=(R', G', B') r0g0b1—(R', G', B') r0g0b0

As described above, consecutive adjacent grid points are sets of two grid points such that interpolation calculation can be performed using only two grid points in Equation 1. The following sets of grid points apply to the cases shown in FIG. 7B.

If the input value d is included in the tetrahedron T0: a set of (r0, g0, b0) and (r1, g0, b0), a set of (r0, g0, b0) and (r1, g1, b1), and a set of (r0, g0, b0) and (r1, g1, b0).

If the input value d is included in the tetrahedron T1: a set of (r0, g0, b0) and (r1, g0, b0), a set of (r0, g0, b0) and (r1, g1, b1), and a set of (r0, g0, b0) and (r1, g0, b1).

If the input value is included in the tetrahedron T2: a set of (r0, g0, b0) and (r0, g0, b1), a set of (r0, g0, b0) and (r1, g1, b1), and a set of (r0, g0, b0) and (r1, g0, b1).

If the input value is included in the tetrahedron T3: a set of (r0, g0, b0) and (r0, g1, b0), a set of (r0, g0, b0) and (r1, g1, b1), and a set of (r0, g0, b0) and (r1, g1, b0).

If the input value is included in the tetrahedron T4: a set of (r0, g0, b0) and (r0, g1, b0), a set of (r0, g0, b0) and (r1, g1, b1), and a set of (r0, g0, b0) and (r0, g1, b1).

If the input value is included in the tetrahedron T5: a set of (r0, g0, b0) and (r0, g0, b1), a set of (r0, g0, b0) and (r1, g1, b1), and a set of (r0, g0, b0) and (r0, g1, b1).

In other words, in the case of performing an interpolation calculation with regard to an input value on a line segment of the aforementioned sets of grid points, in the calculation of Equation 1, the coefficient (at least one out of $\Delta r$, $\Delta g$, and $\Delta b$) of a grid point other than the two aforementioned grid points will be zero. Accordingly, in actuality, it will be a calculation of a linear interpolation between two grid points. In the present embodiment, color material color data in the 1DLUT in FIG. 8 is mapped to consecutive grid points in such a positional relationship, in the order of the gray tone values. Due to having such a configuration, it is possible to obtain an output result that is similar to that of conventional 1DLUT processing, even if interpolation calculation is performed in a 3DLUT. Tetrahedral interpolation was described above as an example, but eight-point interpolation processing for example achieves similar results, and it is sufficient to use two grid points in a positional relationship such that linear interpolation is performed based on only two grid points.

Here, an example in which a 1DLUT is mapped to a 3DLUT will be described. FIG. 9 is a diagram for describing an example in which a 1DLUT is mapped to a 3DLUT. For example, here, color material color data corresponding to a gray tone value of 0 in FIG. 8 is mapped to the origin of the "0-th" arrow in FIG. 9. Then, color material color data corresponding to a gray tone value of 8 in FIG. 8 is mapped to an adjacent grid point along the "0-th" arrow. Furthermore, color material color data corresponding to a gray tone value of 17 in FIG. 8 is mapped to an adjacent grid point along the "0-th" arrow. This mapping continues, and then color material color data corresponding to a gray tone value of 123 in FIG. 8 is mapped to the grid point 255 on the R axis, along the "0-th" arrow. Subsequently, color material color data corresponding to a gray tone value of 132 in FIG. 8 is mapped to an adjacent grid point along the G axis. Subsequently, color material color data corresponding to a gray tone value of 140 in FIG. 8 is mapped to an adjacent grid point along the "0-th" arrow. Hereafter, the aforementioned mapping continues up to a gray tone value of 255 in FIG. 8.

In the present embodiment, the 3DLUT is assumed to have 16×16×16=4096 grid points. Accordingly, 128 1DLUTs, each having 32 grid points as shown in FIG. 8 can be mapped. Regarding the method of mapping a 1DLUT to a 3DLUT, although mapping is performed on an RG plane that is defined by RG reference axes in FIG. 9, it may be performed on a BR plane. In other words, it need only be possible to consecutively map the aforementioned two adjacent grid points in a positional relationship such that linear interpolation is performed based on only two grid points.

In the aforementioned "information on the storage position of the color material color conversion table in the 3DLUT", storage positions are designated at addresses from the 0-th address up to and including the 127th address, as shown in FIG. 9 for example. In FIG. 9, color material color data from a 1DLUT corresponding to color tones is mapped to addresses on the G axis beginning at the position where R=G=0 (the origin), in an RG plane in the case where the B-axis value is fixed. As shown in FIG. 9, a total of 128 (i.e., 128 types of color tones) 1DLUTs from the 0-th line up to and including the 127th line are mapped to an RGB space.

Figure 10:
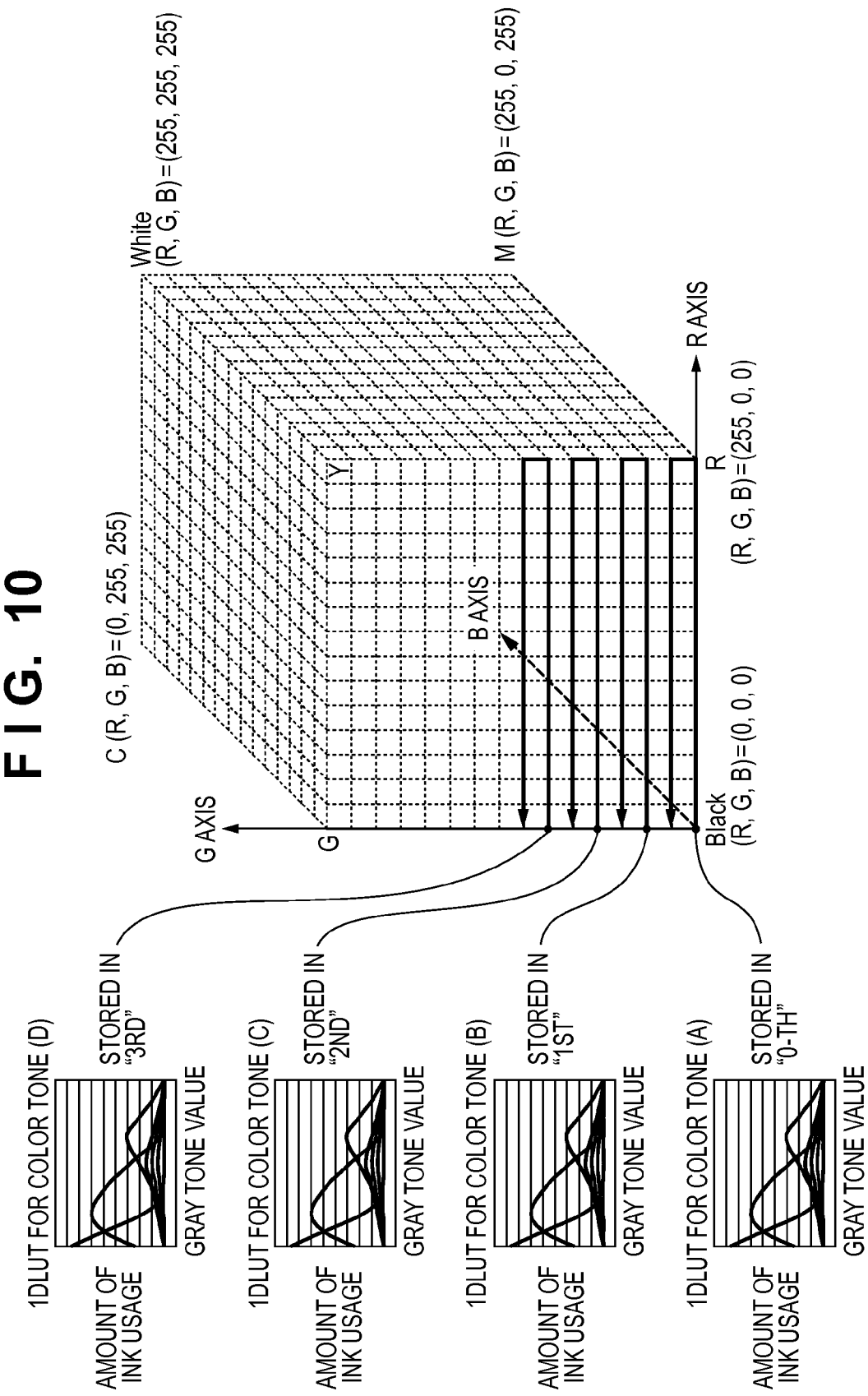
FIG. 10 is a diagram showing a concept of the 3DLUT to which the 1DLUT is mapped.

FIG. 10 is a diagram showing an illustration of a 3DLUT to which color material color conversion tables (1DLUTs) for four types of monochrome images have been mapped by the color material color coefficient generation unit 607 for example. As shown in FIG. 10, the 1DLUT for a monochrome image is mapped to grid points at the addresses in the 0-th to 3rd lines. Thus, in color material color development processing performed by the printer, color material color conversion tables (1DLUT) for a monochrome image for multiple types of color tones are mapped to one 3DLUT, and therefore color material color development processing for multiple types of color tones is performed with processing that is carried out one time. As a result, the speed of printing can be improved compared to the case where color material color development processing is carried out once for each tone.

Generation of One-to-Three Conversion Table in One-to-Three Conversion Unit

Next, the generation of a one-to-three conversion table to be used in the one-to-three conversion unit 605 will be described. As shown in FIG. 13, the one-to-three conversion unit 605 performs color conversion of input monochrome data into RGB data as the intermediate image data with use of a one-to-three conversion table. Then, color material color data corresponding to RGB data resulting from color conversion is obtained from a 3DLUT such as that described in FIG. 9 and FIG. 10.

Figure 11:
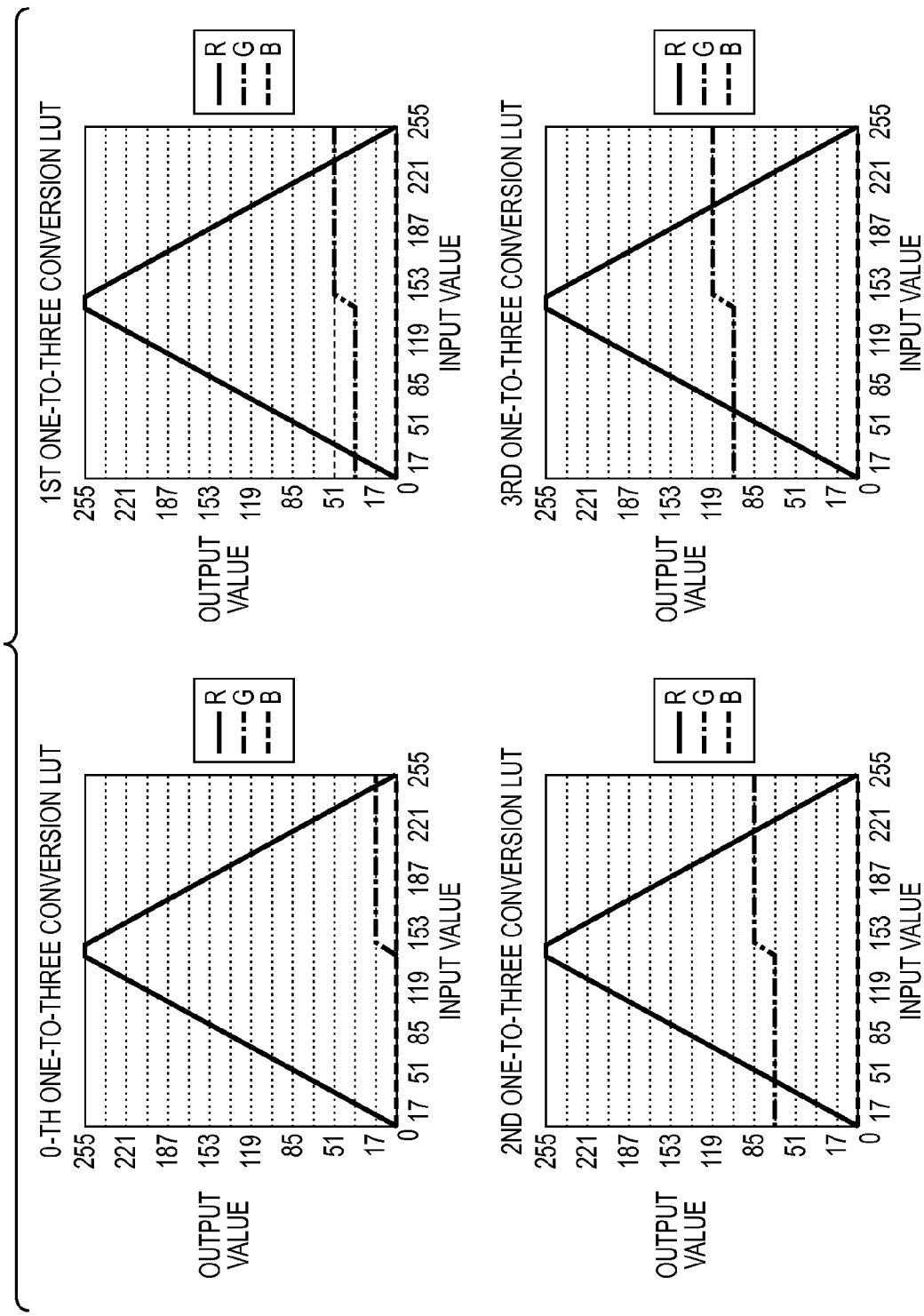
FIG. 11 is a diagram showing an example of a one-to-three conversion table.

In the present embodiment, a table in which corresponding gray tone values and the RGB coordinate values thereof are mapped along the "0-th" arrow in FIG. 9 is generated as the one-to-three conversion table. In other words, the gray tone value of 0 that corresponds to the origin 0 is mapped to the RGB=(0, 0, 0) of that point. Then, the gray tone value of 16 that corresponds to an adjacent grid point on the R axis is mapped to the RGB=(34, 0, 0) of that point. The one-to-three conversion table indicated by "0-th" in FIG. 11 is obtained by continuing this type of mapping. In other words, change of RGB coordinate values along the "0-th" arrow in FIG. 9 is indicated in the "0-th" one-to-three conversion table in FIG. 11. In this way, in each grid other than the origin, a gray gradation value is associated with a RGB coordinate value in which at least two of R, G, and B differ from each other.

For example, when performing pattern printing processing with respect to monochrome image data, first, the one-to-three conversion unit 605 converts monochrome image data into RGB data. For example, the gray tone value of 17 is converted into RGB data where RGB=(34, 0, 0). Then, in the downstream color material color development processing unit 610 in the printer 107, color material color data mapped to the RGB=(25.5, 0, 0) in the 3DLUT is obtained. The color material color data that is obtained is of course color material color data that corresponds to the gray tone value of 17 in FIG. 8.

In the present embodiment, conversion in the one-to-three conversion unit 605 may be performed multiple times (equal to the number of the patterns) using one one-to-three conversion table, and a configuration is possible in which one-to-three conversion is performed using multiple one-to-three conversion tables. Also, in the present embodiment, a description was given regarding RGB data, in which the LUT used in color material color development processing is three-dimensional, but similar processing is possible with a four-dimensional LUT for CMYK data as well.

Embodiment 2

In Embodiment 1, a method was described in which input values not at grid points in the 3DLUT are calculated by interpolation calculation using adjacent grid points. In the present embodiment, a method of holding grid point data corresponding to all tone values of monochrome image data will be described. For example, if monochrome image data is assumed to have 256 tones in 8-bit data, data on 256 grid points are used as a table for monochrome images. In other words, grid point data for all 256 tone values of monochrome image data are held in a 3DLUT. In this case, grid point data in the 3DLUT need only be referenced, and interpolation calculation does not occur. Accordingly, when grid point data for monochrome image data is to be stored in the 3DLUT, it is not necessary to map that grid point data to adjacent grid point positions, as in the case described in Embodiment 1. In other words, grid point data of a 1DLUT can be mapped to random grid point positions in a 3DLUT. For example, if the number of grid points in the 3DLUT is 16×16×16=4096, 16 1DLUTs having 256 grid points each can be mapped to the 3DLUT, and in such a case, pattern printing of at most 16 types can be executed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-182639, filed Aug. 21, 2012, which is hereby incorporated by reference herein in its entirety.

What is claimed is:

1. An image processing apparatus for processing image data, the image processing apparatus comprising:
  an acquisition unit configured to acquire monochrome image data indicating a gradation value of grey line;
  a first conversion unit configured to convert the monochrome image data acquired by said acquisition unit into intermediate image data by using a first lookup table, wherein the first lookup table associates a gradation value of grey line with a coordinate value of a color space;
  an image processing unit configured to process the intermediate image data converted by said first conversion unit; and
  a second conversion unit configured to convert the intermediate image data processed by said image processing unit into ink material data for printing a monochrome image by using a second lookup table, wherein the second lookup table associates a coordinate value of the color space with the ink material data,
  wherein a combination of the gradation value and the ink material data is assigned to a coordinate of the color space, and wherein the first lookup table and the second lookup table are defined based on the color space.

2. The image processing apparatus according to claim 1, wherein said first conversion unit converts the monochrome image data into the intermediate image data corresponding to a plurality of monochrome pattern images by using the first lookup table, and wherein said first conversion unit uses different first lookup tables for the plurality of monochrome pattern images.

3. The image processing apparatus according to claim 2, wherein the different first lookup tables are defined in different areas in the color space.

4. The image processing apparatus according to claim 1, wherein the combination of the gradation value and the ink material data is assigned to the coordinate on a plane in the color space.

5. The image processing apparatus according to claim 4, wherein the plane is defined by two axes of the color space.

6. The image processing apparatus according to claim 5, wherein combinations of the gradation value and the ink material data are aligned in an order based on the gradation value.

7. The image processing apparatus according to claim 1, further comprising:
  a print control unit configured to control a print unit to perform printing based on the ink material data converted by said second conversion unit.

8. The image processing apparatus according to claim 1, wherein the first lookup table is defined according to at least one of a color tone, brightness, or contrast.

9. The image processing apparatus according to claim 1, wherein said image processing unit generates intermediate image data including the plurality of monochrome pattern images, and
  said second conversion unit converts the intermediate image data including the plurality of monochrome pattern images into the ink material data.

10. The image processing apparatus according to claim 1, further comprising a holding unit configured to hold data of the color space in which the combination of the gradation value and the ink material data is assigned to the coordinate.

11. The image processing apparatus according to claim 10, further comprising a generation unit configured to generate the data of the color space based on a predetermined 1D-LUT associating a gradation value with ink amount data, and
  wherein said holding unit holds the data of the color space generated by said generation unit.

12. The image processing apparatus according to claim 1, wherein the color space is an RGB color space.

13. The image processing apparatus according to claim 1, wherein the ink material data indicates each amount of CMYK inks.

14. The image processing apparatus according to claim 2, wherein said first conversion unit converts the monochrome image data into the intermediate image data corresponding to the plurality of monochrome pattern images by using the first lookup table, in a case where a user instruction for printing a plurality of monochrome pattern images having different parameters is accepted.

15. An image processing method of processing image data, the method comprising:
  an acquisition step of acquiring monochrome image data indicating a gradation value of grey line;
  a first conversion step of converting the monochrome image data acquired by the acquisition step into intermediate image data by using a first lookup table, wherein the first lookup table associates a gradation value of grey line with a coordinate value of a color space;
  an image processing step of processing the intermediate image data converted by the first conversion step; and
  a second conversion step of converting the intermediate image data processed by the image processing step into ink material data for printing a monochrome image by using a second lookup table, wherein the second lookup table associates a coordinate value of the color space with the ink material data,
  wherein a combination of the gradation value and the ink material data is assigned to a coordinate of the color space, and wherein the first lookup table and the second lookup table are defined based on the color space.

16. The image processing method according to claim 15, wherein said first conversion step converts the monochrome image data into the intermediate image data corresponding to a plurality of monochrome pattern images by using the first lookup table, and wherein the first conversion step uses different first lookup tables for the plurality of monochrome pattern images.

17. The image processing method according to claim 16, wherein the different first lookup tables are defined in different areas in the color space.

18. The image processing method according to claim 17, wherein the different first lookup tables are defined in different areas of a same plane in the color space.

19. The image processing method according to claim 16, wherein the first conversion step of converting the monochrome image data into the intermediate image data corresponding to the plurality of monochrome pattern images by using the first lookup table, in a case where a user instruction for printing a plurality of monochrome pattern images having different parameters is accepted.

20. The image processing method according to claim 17, wherein coordinate values included in the respective different first lookup tables correspond to different second lookup tables.

21. The image processing method according to claim 15, wherein the combination of the gradation value and the ink material data is assigned to the coordinate on a plane in the color space.

22. The image processing method according to claim 21, wherein the plane is defined by two axes of the color space.

23. The image processing method according to claim 22, wherein combinations of the gradation value and the ink material data are aligned in an order based on the gradation value.

24. The image processing method according to claim 15, further comprising:
a print control step of controlling a print step to perform printing based on the ink material data converted by the second conversion step.

25. The image processing method according to claim 15, wherein the first lookup table is defined according to at least one of a color tone, brightness, or contrast.

26. The image processing method according to claim 15, wherein the image processing step generates intermediate image data including the plurality of monochrome pattern images, and
a second conversion step converts the intermediate image data including the plurality of monochrome pattern images into the ink material data.

27. The image processing method according to claim 15, further comprising a holding step of holding data of the color space in which the combination of the gradation value and the ink material data is assigned to the coordinate.

28. The image processing method according to claim 27, further comprising a generation step of generating the data of the color space based on a predetermined 1D-LUT associating a gradation value with ink amount data, and
wherein the holding step of holding the data of the color space generated by the generation step.

29. The image processing method according to claim 15, wherein the color space is an RGB color space.

30. The image processing method according to claim 15, wherein the ink material data indicates each amount of CMYK inks.

31. The image processing method according to claim 15, wherein a number of coordinate values associated with gradation values in the color space is larger than a number of grid points corresponding to a color element in the color space, wherein the grid points are related to the second lookup table.

32. The image processing method according to claim 31, wherein the number of the coordinate values associated with the gradation values in the color space is a number of gradation values indicated by the monochrome image data acquired in said acquisition step.

33. A non-transitory computer-readable storage medium storing a program for, in order to process image data, causing a computer to execute:
an acquistion step of acquiring monochrome image data indicating a gradation value of grey line;
a first conversion step of converting the monochrome image data acquired by the acquistion step into intermediate image data by using a first lookup table, wherein the first lookup table associates a graduation value of grey line with a coordinate value of a color space;
an image processing step of processing the intermediate image data converted by the first conversion step; and
a second conversion step of converting the intermediate image data processed by the image processing step into ink material data for printing a monochrome image by using a second lookup table, wherein the second lookup table associates a coordinate value of the color space with the ink material data,
wherein a combination of the gradation value and the ink material data is assigned to a coordinate of the color space, and wherein the first lookup table and the second lookup table are defined based on the color space.

34. An image processing system for processing monochrome image data so as to print a plurality of monochrome pattern images having different parameters, the system comprising:
an acquisition unit configured to acquire the monochrome image data;
a first conversion unit configured to convert the monochrome image data acquired by said acquisition unit into intermediate image data by using a first lookup table, wherein the first lookup table associates a gradation value with a coordinate value of a color space;
an image processing unit configured to process the intermediate image data converted by said first conversion unit;
a second conversion unit configured to convert the intermediate image data processed by said image processing unit into ink material data for printing a monochrome image by using a second lookup table, wherein the second lookup table associates a coordinate value of the color space with the ink material data; and
a printing unit configured to perform printing based on the ink material data converted by said second conversion unit, and
wherein a combination of the gradation value and the ink material data is assigned to a coordinate of the color space, and wherein the first lookup table and the second lookup table are based on the color space.

35. The system according to claim 34, wherein the system includes a print control apparatus and a printing apparatus, and
the print control apparatus comprises said acquisition unit, said first conversion unit, said image processing unit, and the printing apparatus comprises said second conversion unit and said printing unit.

36. The system according to claim 35, further comprising a transmitting unit configured to transmit the intermediate image data processed by said image processing unit to the printing apparatus.

37. An image processing apparatus for processing monochrome image data so as to print a plurality of monochrome pattern images having different parameters, the image processing apparatus comprising:
- an acquisition unit configured to acquire the monochrome image data indicating a gradation value of grey line;
- a conversion unit configured to convert the monochrome image data acquired by said acquisition unit into intermediate image data by using a first lookup table, wherein the first lookup table associates a gradation value of grey line with a coordinate value of a color space;
- an image processing unit configured to process the intermediate image data converted by said conversion unit; and
- a transmit unit configured to transmit the intermediate image data processed by said image processing unit, to a unit for converting the intermediate image data processed by said image processing unit into ink material data for printing a monochrome image by using a second lookup table, wherein the second lookup table associates a coordinate value of the color space with the ink material data,
- wherein a combination of the gradation value and the ink material data is assigned to a coordinate of the color space, and wherein the first lookup table and the second lookup table are defined based on the color space.

38. The image processing apparatus according to claim 37, wherein a number of coordinate values associated with gradation values in the color space is larger than a number of grid points corresponding to a color element in the color space, wherein the grid points are related to the second lookup table.

39. The image processing apparatus according to claim 38, wherein the number of the coordinate values associated with the gradation values in the color space is a number of gradation values indicated by the monochrome image data acquired by said acquisition unit.

40. The image processing apparatus according to claim 37, wherein said first conversion unit converts the monochrome image data into the intermediate image data corresponding to a plurality of monochrome pattern images by using the first lookup table, and wherein the first conversion step uses different first lookup tables for the plurality of monochrome pattern images.

41. The image processing apparatus according to claim 40, wherein the different first lookup tables are defined in different areas in the color space.

42. The image processing apparatus according to claim 41, wherein the different first lookup tables are defined in different areas of a same plane in the color space.

43. The image processing apparatus according to claim 41, wherein coordinate values included in the respective different first lookup tables correspond to different second lookup tables.

44. The image processing apparatus according to claim 37, wherein the combination of the gradation value and the ink material data is assigned to the coordinate on a plane in the color space.

45. An image processing apparatus for processing monochrome image data, the image processing apparatus comprising:
- an acquisition unit configured to acquire the monochrome image data indicating a gradation value of grey line;
- a conversion unit configured to convert the monochrome image data acquired by said acquisition unit into intermediate image data by using a first lookup table, wherein the first lookup table associates a gradation value of grey line with a coordinate value of a color space; and
- a transmit unit configured to transmit the intermediate image data, to a unit for converting the intermediate image data into ink material data for printing a monochrome image by using a second lookup table, wherein the second lookup table associates a coordinate value of the color space with the ink material data,
- wherein, a number of coordinate values associated with gradation values in the color space is larger than a number of grid points corresponding to a color element in the color space, wherein the grid points are related to the second lookup table, and
- wherein a combination of the gradation value and the ink material data is assigned to a coordinate of the color space, and wherein the first lookup table and the second lookup table are defined based on the color space.

46. The image processing apparatus according to claim 45, wherein the color space is an RGB color space.

* * * * *